Feb. 11, 1947.   H. L. HILL   2,415,634
ELECTRIC MOTOR
Filed March 2, 1943   2 Sheets-Sheet 1
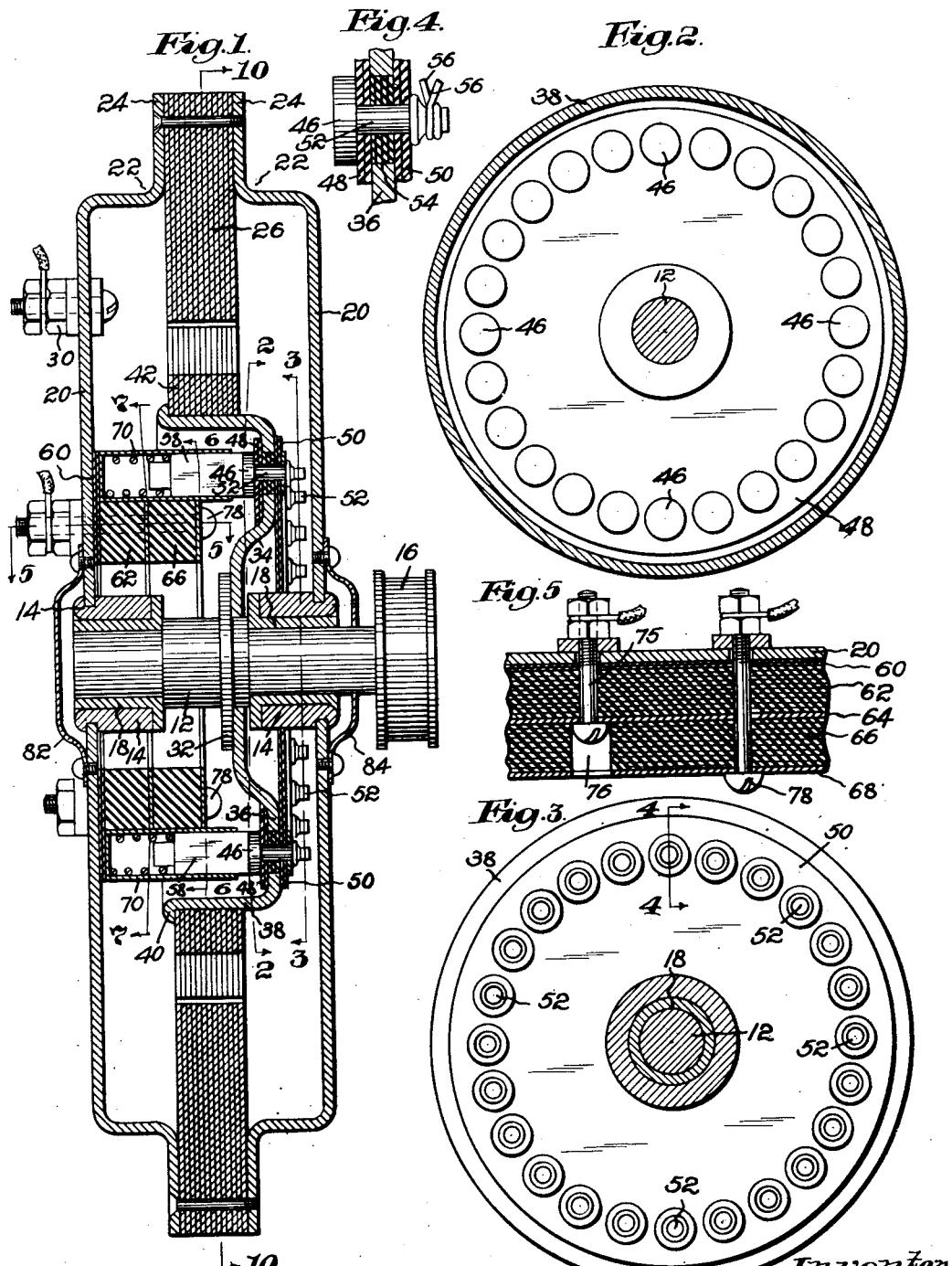
Inventor
Hillary L. Hill
By Emery, Booth, Townsend, Miller & Whiting
Attys Feb. 11, 1947. H. L. HILL 2,415,634
ELECTRIC MOTOR
Filed March 2, 1943 2 Sheets-Sheet 2
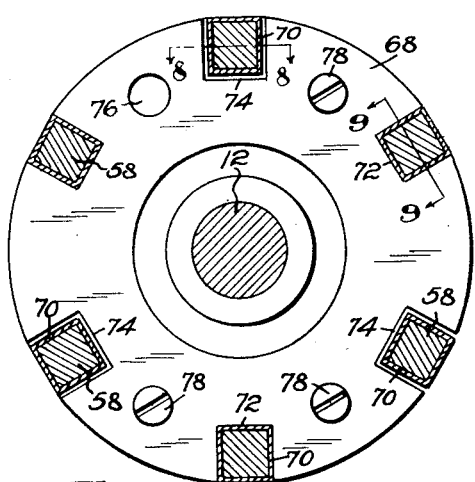
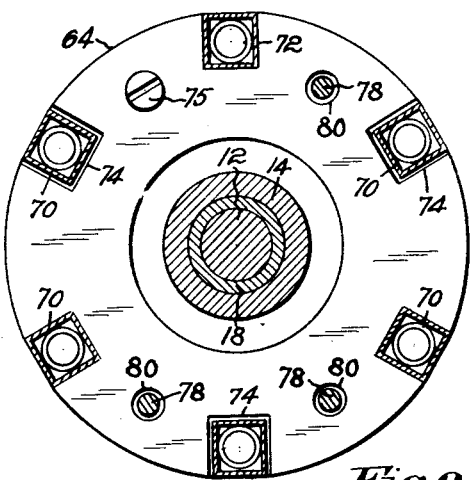
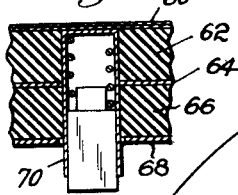
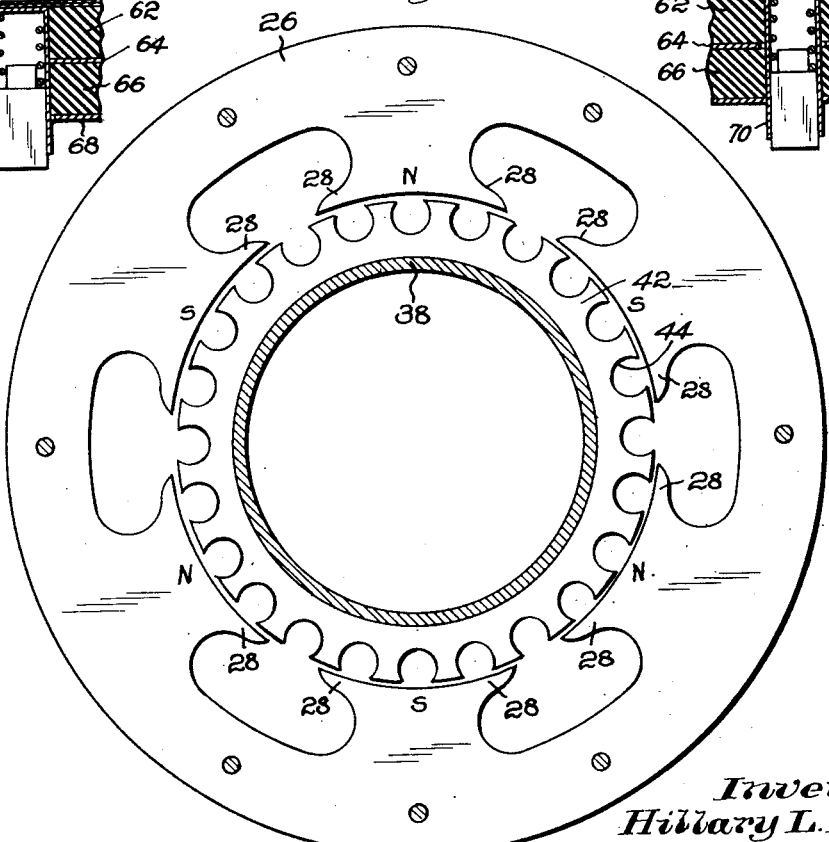
Inventor:
Hillary L. Hill,
by Emery, Booth, Townsend, Miller, Whitner Attys Patented Feb. 11, 1947

2,415,634

UNITED STATES PATENT OFFICE 2,415,634

ELECTRIC MOTOR

Hillary L. Hill, Chelmsford, Mass., assignor to A. S. Campbell Co. Inc., East Boston, Mass., a corporation of Massachusetts Application March 2, 1943, Serial No. 477,695

11 Claims. (Cl. 172—36)

This invention relates to electric motors. A cardinal object of the invention is to provide an effective construction whereby there is produced what may be termed a "flat" motor, that is, one of very restricted axial dimension. Co-ordinate objects are to provide a construction cheap and easy to manufacture embodying many parts which may be formed from sheet metal stampings or similarly shaped elements of sheet-like character.

A flat motor such as referred to has many advantageous uses. I may cite by way of example the operation of windows or like sliding panels such, for example, as the window in an automobile door, in which case the motor may be housed between the panels of the lower portion of the door with its axis extending transversely of the vehicle, and the power adjustment of the movable seats in automobiles, in which case it would be stowed under the seat with the axis vertical. Other applications will suggest themselves.

My invention will be well understood by reference to the following description taken in connection with the accompanying drawings, wherein:

Fig. 1 is a central vertical section through the motor, the windings being omitted for clearness;

Figs. 2 and 3 are sections on the lines 2—2 and 3—3 of Fig. 1 respectively;

Fig. 4 is a sectional detail on the line 4—4 of Fig. 3 and on an enlarged scale;

Figs. 5, 6 and 7 are sections on the similarly numbered lines of Fig. 1;

Figs. 8 and 9 are sections on the lines 8—8 and 9—9 respectively of Fig. 6; and

Fig. 10 is a section on a smaller scale on the line 10—10 of Fig. 1, the central portion being broken away.

Referring now to Fig. 1 of the drawings, I there show a shaft 12 having reduced end portions received in external bearings 14 of the so-called oilless type, the shaft projecting at one end to receive a driving pulley 16. Bushings 18 externally fitting the bearings support the end bells 20, which are formed from relatively thin sheet material, have their peripheries marginally inturned toward each other at 22 and terminate in radially extending flanges 24, herein outwardly extending, between which are received and clamped the field laminations 26. These laminations, 26 as seen in Fig. 10, are provided with the inwardly projecting pole-forming portions 28 which receive the usual field windings, not shown. A six-pole motor is illustrated. Suitably insulated bolts 30 (see Fig. 1) carried by one of the end bells provide for connection of the field windings to the line.

Referring again to Fig. 1, the shaft 12 is herein shown as provided with a radially extending flange 32 from which is supported the frame for the rotor or armature which herein has the general form of a cup having a depressed bottom portion secured to the flange as by spot welding and presenting an inner wall 34, a radially extending wall 36 and a reversely extending cylindrical wall 38 terminating in an outwardly directed flange 40. The central space within the depression bounded by the wall 34 may serve as to accommodate at least in part the right-hand bearing 14, this construction contributing to attainment of a restricted axial dimension for the motor as a whole.

Armature laminations 42 encircle the cylindrical wall 38 and may be slipped over the cup from the right, viewing Fig. 1, to be supported at the left by the flange 40. In Fig. 10 I have shown these laminations as formed with twenty-four equally spaced slots to receive armature windings (not shown) in well known manner. Thus the first winding might be through the first and fifth slots, the next through the fifth and ninth, and so on.

The radial wall 36 of the cup accommodates commutator segments 46 which herein face axially. When the wall is of metal, insulating rings 48 and 50 on either side thereof are provided. The commutator segments are herein shown as formed of the heads of rivet-like elements having shanks 52 passing axially through the rings and through clearance holes 54 in the wall 36. These shanks 52 initially have an inner, relatively large portion and a distal portion of somewhat smaller diameter which permits a hollow set to be placed over the same to upset the larger portion on the right-hand face (viewing Figs. 1 and 4) of the ring 50, leaving the distal portion of the shank extending as shown. As seen in Fig. 4, the ends 56 of the armature coil windings may be brought down and twisted about the projecting ends 54. When all the parts of the armature are assembled, the projecting ends of the rivet-like elements may then be dipped as a unit into an annular vessel containing a bath of solder permitting all the connections 56, forty-eight in all in the example shown, to be effected by a single soldering operation.

Brushes 58 are spring pressed axially against the commutator segments 46 and, as seen in Fig. 1, are accommodated inwardly of the outer cylindrical wall 38 of the cup.

I shall next describe the brush assembly herein shown. Referring to Fig. 1 and proceeding from left to right, there is there shown a disc or ring 60 of insulating material utilized to back up the brush holders, hereinafter to be referred to, when the left-hand end plate 20 is of conductive material and superposed thereon serially are an inner insulating ring 62 of substantial thickness, a brass brush ring 64 which we may term for distinction the negative ring, an insulating ring 66 similar to the ring 62 and an outer positive brush ring 68 of brass. These rings are disposed in encircling relation to the shaft and at least in part are, as shown, housed within the hollow of the armature cup defined by the outer wall 38.

As best seen by a comparison of Figs. 1, 8 and 9, the insulating rings 62 and 64 are provided at equally spaced points about their periphery with notches opening radially and adapted to receive with a press fit the tubular brass brush holders 70 preferably of square section as shown best in Figs. 6 and 7, in which the brushes 58 operate in the manner of plungers. Referring now to Fig. 6, the negative brush ring 68 is provided in the 2, 6 and 10 o'clock positions with similar notches 72 in which alternate brush holders are received with a press fit to provide an electrical connection, while in the 12, 4 and 8 o'clock positions notches 74 of larger dimensions are provided so that the other brush holders of the set have a clearance from the ring 68 and there is no electrical connection. In the case of the positive ring 64 shown in Fig. 7, the notches 72 which fit the brush holders are in the 12, 4 and 8 o'clock positions and the clearance notches 74 in the 2, 4 and 10 o'clock positions.

To provide for connecting rings 64 and 68 to the line the bolts 75 (Figs. 5 and 7) may extend from ring 68 rearwardly to the exterior of the motor housing, the head of the bolt being received in a suitable opening 76 provided therefor in the outer insulating ring 66 and lying remote from the ring 68. Bolts 78 (Fig. 6) have heads overlying the ring 68 and extend to the exterior of the motor housing through clearance holes 80 provided in the ring 64 so that they are not in electrical connection therewith, and to one of these bolts the lead to its side of the line may be connected.

In practice the two rings 64 and 68 may be duplicates with one hole formed of the same size as the shank of the bolts and three other holes larger than the shank of the bolts but smaller than their heads. In assembly one is turned upside down relatively to the other so that the small hole through which contact is made in the case of plate 64 (Fig. 7) is disposed in the 11 o'clock position shown, whereas in the case of the outer plate (Fig. 6) it is disposed in the 1 o'clock position.

It will be noted that the wide bearings provided for the brush holders 70 by the thick insulating rings 62 and 66 hold all the superposed rings 62, 64, 66 and 68 of the brush assembly in alignment and in particular the various bolt-accommodating holes which have been referred to, insuring effective air gap at the clearance holes.

In Fig. 2 I have shown a retainer cup 82 overlying the left-hand end of the shaft and secured to the left-hand end bell 20 while a retainer cup 84, similar but centrally apertured to pass the shaft 12, is provided at the right-hand side of the motor, viewing Fig. 1.

Referring again to Fig. 10, it will be noted that the field laminations 26 extend radially for a substantial distance beyond the pole-forming projections 28 on which the windings are mounted. Thus, in spite of the small axial dimension of the assembly as illustrated in Fig. 1, a body of iron of ample cross section is provided between the poles to provide a path for the lines of force. In the application of small motors to tight places the usual aim hitherto has been to reduce the diameter of the motor and this has resulted in a scamping of the amount of magnetic material available at this location. If such a motor is applied, for example, to an automobile window regulator adjacent to a large metallic panel, leakage tends to occur through this panel which is set into vibration as the motor rotates with resultant objectionable noise. The principle of my present motor, however, is to shrink it to minimum dimensions axially while making it of relatively large diameter permitting it to be mounted in a narrow place such as a door with the axis extending transversely to the door. The cup 38 on which the armature is mounted not only provides for shortening the dimensions axially by accommodating at least in part the commutator mechanism but permits the use of armature and field laminations of large circumference to permit the use of adequate amounts of material within the restricted axial dimension, this increased circumference being utilized in the present instance to provide the six poles.

While the exact dimensions are, of course, not of the essence of the invention, it may be useful by way of example to state that the exemplary construction illustrated is a motor designed for the operation of the window in an automobile door and having an exterior diameter of 6⅜ inches and a dimension of 2 inches from end to end of the shaft 12, including the overhanging portion on which the pulley 16 is supported, the distance between the relatively remote faces of the bearings 14 being an inch and a half.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. In an electric motor the rotor comprising a shaft, a member of sheet material carried thereby having an inner wall spaced from the shaft, a radially extending wall rising therefrom and an outer, reversely extending, generally cylindrical wall, armature laminations encircling the outer wall, commutator segments carried by the radial wall and exposed at the interior beneath the outer wall and having means exposed at the exterior for the connection of armature windings, the space within the inner wall providing at least in part for the accommodation of a shaft bearing and the space within the outer wall providing at least in part for the accommodation of a brush assembly having brushes pressed axially against the segments.

2. In an electric motor the rotor comprising a shaft, a member of sheet material carried thereby having an inner wall spaced from the shaft, a radially extending wall rising therefrom and an outer, reversely extending, generally cylindrical wall and terminating in an outwardly extending flange, armature laminations encircling the outer wall and axially supported by said flange, commutator segments carried by the radial wall and exposed at the interior beneath the outer wall and having means exposed at the exterior for the connection of armature windings, the space within the inner wall providing at least in part for the accommodation of a shaft bearing and the space within the outer wall providing at least in part for the accommodation of a brush assembly having brushes pressed axially against the segments.

3. In an electric motor a rotor comprising a shaft, a cup-like element carried thereby having a substantially radial wall and an outer, generally cylindrical wall, armature laminations exteriorly encircling the cylindrical wall, commutator segments carried by the radial wall and facing the interior of the cup, a brush assembly comprising insulated collecting rings and axially pressed brushes associated therewith organized in encircling relation to the shaft and accommodated at least in part in the space within the cylindrical wall and a field structure radially outward of the armature laminations.

4. In an electric motor a cup of sheet material having a radial wall and an overhanging cylindrical wall, armature laminations encircling the cylindrical wall, commutator elements of rivet-like structure having heads exposed at the inner face of the radial wall to provide contacts, the stems extending through the radial wall, anchored in the same and projecting a substantial distance to provide for the connection of armature windings thereto as described, and axially pressed brushes extending into the space within the cylindrical wall for cooperation with the contacts.

5. In an electric motor a cup of sheet material having a radial wall and an overhanging cylindrical wall, armature laminations encircling the cylindrical wall, commutator elements of rivet-like structure having heads exposed at the inner face of the radial wall to provide contacts, the stems extending through the radial wall, anchored in the same and projecting a substantial distance to provide for the connection of armature windings thereto as described, and axially pressed brushes extending into the space within the cylindrical wall for cooperation with the contacts, the bottom of the cup inwardly of the segments being depressed to provide space for a rotor bearing.

6. In an electric motor a cup of sheet material having an exterior cylindrical wall with an outwardly flanged lip, armature laminations embracing the wall and bearing on the lip, an annular series of commutator segments carried by the bottom wall of the cup and exposed at the interior thereof and having means exposed at the exterior wall for connecting the segments of armature windings.

7. In an electric motor a cup of sheet material having an exterior cylindrical wall, armature laminations embracing the wall, an annular series of commutator segments carried by the bottom wall of the cup and exposed at the interior thereof having shanks anchored to the wall and projecting a substantial distance beyond the same to provide for the connection of armature windings thereto as described.

8. In an electric motor the brush assembly, an inner metallic disc, an insulating disc and an outer metallic disc superposed in order, the several discs having peripheral notches opening radially to receive axially extending brush holders in the form of non-circular tubes, the notches of the metallic discs being alternately of a size to fit the holders and larger, the smaller notches of the two discs fitting alternate holders, a bolt engaging the inner disc and extending rearwardly to provide for an electrical connection thereto, and other bolts passing through all the discs, in the case of the inner disc, however, through relatively large openings therein excluding conducting contact, one at least of the latter bolts being in conducting contact with the outer disc to provide for an electric connection thereto.

9. In an electric motor the brush assembly comprising a pair of superposed insulating discs having peripheral notches, axially extending brush holders in the form of non-circular tubes fitting the notches, conducting plates associated with each holder having corresponding notches, those of the two plates fitting alternate holders respectively, the plates being cut away between the notches to pass the other holders, and means for connecting the plates respectively to opposite sides of a line.

10. In an electric motor the brush assembly comprising a pair of superposed insulating discs having peripheral notches, axially extending brush holders in the form of non-circular tubes fitting the notches, conducting plates associated with each holder having corresponding notches, alternately of the same size and larger than the holders, the smaller notches of the two plates fitting alternate holders respectively, and means for connecting the plates respectively to opposite sides of the line.

11. In an electric motor a pair of end bells of sheet material having peripheral flanges, annular field laminations received between the flanges, a cup-shaped element having its side wall extending into the central space defined by the field laminations, annular armature laminations fitting over said end wall, commutator segments carried by the bottom wall of the cup and exposed at the interior thereof, means exposed at the exterior of said wall for connecting the segments to armature windings, a brush mounting at the open end of the cap having an annular series of axially extending brushes for cooperating with the segments.

HILLARY L. HILL.

REFERENCES CITED

The following references are of record in the file of this patent:

UNITED STATES PATENTS

| Number | Name | Date |
|---|---|---|
| 1,219,564 | Kouyoumjian | Mar. 20, 1917 |
| 2,176,118 | Brinda | Oct. 17, 1939 |
| 1,835,354 | Stockman | Dec. 8, 1931 |
| 1,643,191 | Welch | Sept. 20, 1927 |
| 1,946,957 | Allen | Feb. 13, 1934 |